W. N. REGAN.
STOVE.
APPLICATION FILED NOV. 17, 1919.
1,360,795.
Patented Nov. 30, 1920.
2 SHEETS—SHEET 1.
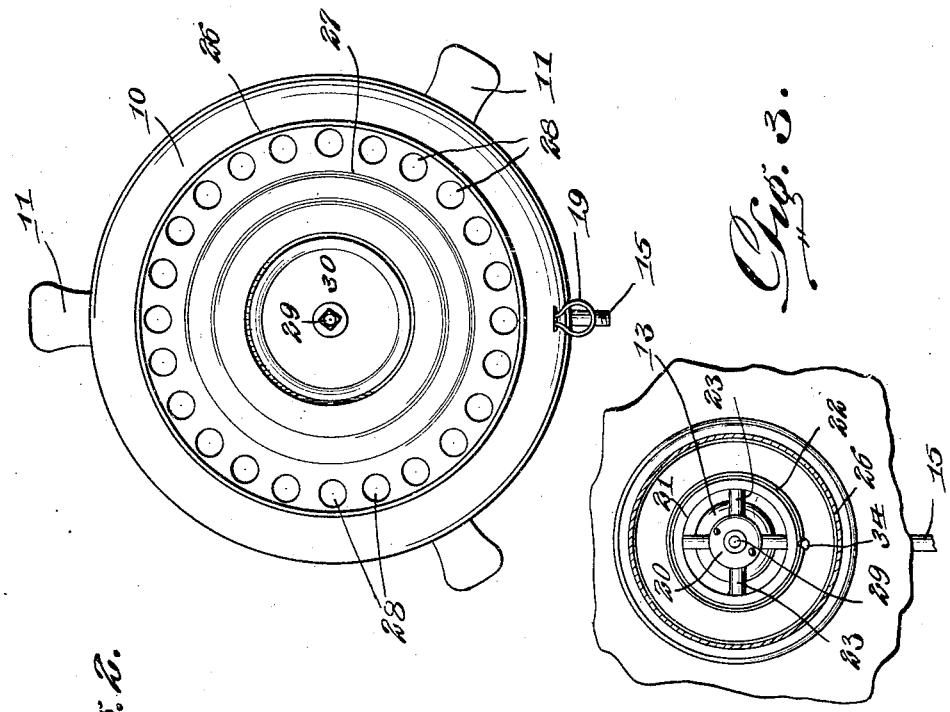
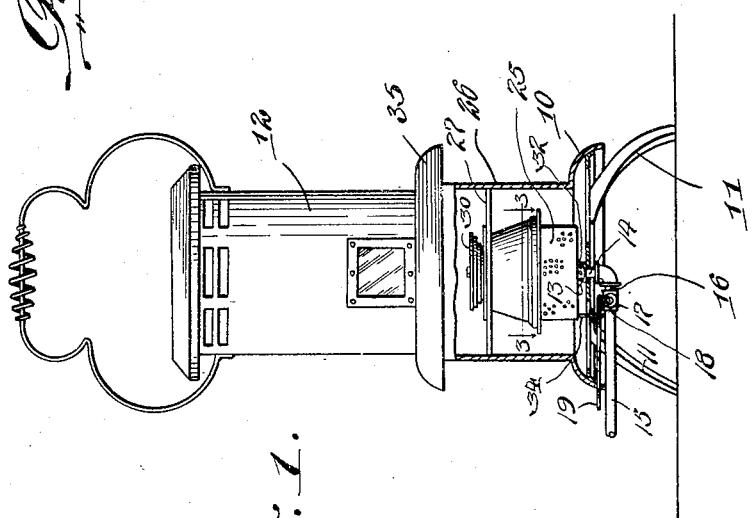
Witnesses
Frederick L. Fox,
Inventor
W. N. Regan.
By Victor J. Evans.
Attorney

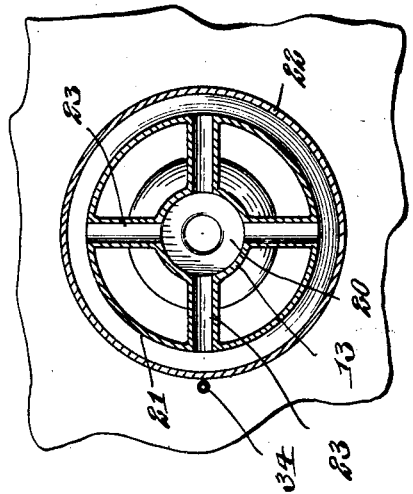
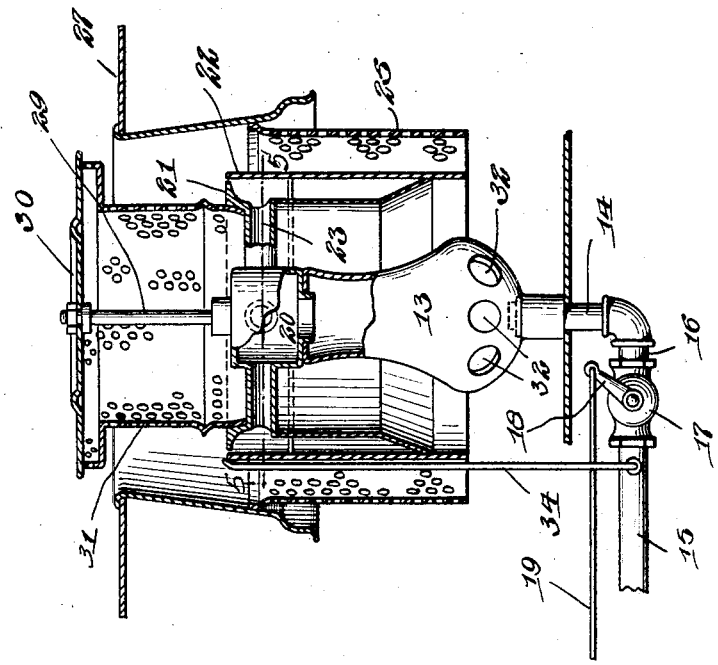

UNITED STATES PATENT OFFICE.

WILLIAM N. REGAN, OF JERSEY CITY, NEW JERSEY.

STOVE.

1,360,795.

Specification of Letters Patent.  Patented Nov. 30, 1920.

Application filed November 17, 1919. Serial No. 338,686.

*To all whom it may concern:*

Be it known that I, WILLIAM N. REGAN, a citizen of the United States, residing at Jersey City, in the county of Hudson and State of New Jersey, have invented new and useful Improvements in Stoves, of which the following is a specification.

This invention relates to gas stoves or the like of the portable type, and has particular application to the burner construction which is such as to cause the air to circulate through channels which will heat the air to a very high degree in short order, thus consuming a minimum of fuel.

The nature and advantages of the invention will be better understood when the following detail description is taken in connection with the accompanying drawings, the invention residing in the construction, combination and arrangement of parts as claimed.

In the drawings forming part of this specification like numerals of reference indicate similar parts in the several views and wherein:

Figure 1 is a front elevation of a stove partly in section showing in elevation the position of burner therein.

Fig. 2 is a horizontal sectional view taken through the stove immediately above the burner.

Fig. 3 is a sectional view taken on line 3—3 of Fig. 1 looking in the direction of the arrows.

Fig. 4 is an enlarged vertical sectional view through the burner showing its connection with the fuel supply pipe.

Fig. 5 is a horizontal sectional view taken on line 5—5 of Fig. 4 looking in the direction of the arrows.

Referring to the drawings in detail, 10 indicates the base of the stove supported by the legs 11, the burner being disposed immediately above the base while arranged above the burner is the drum 12. The burner proper includes a mixing chamber 13 with the bottom of which the supply pipe 14 communicates. The supply pipe depends from the bottom of the mixing chamber through the base 10 and has a laterally disposed extension 15. A valve 17 is fitted within the extension 16 and includes an arm 18 which is connected with an operating rod 19 which operates through an opening in the base 10. Supported upon the mixing chamber 13 is a distributing chamber 20 which communicates with the space between the inner and outer members 21 and 22 respectively of the burner by means of the connecting tubes 23. A perforated annulus 25 is supported by the lower end of the drum 12 and disposed concentrically to the mixing chamber 13, while similarly disposed in spaced relation with regard to the annulus 25 is a wall or casing 26. Surrounding the burner proper and snugly fitted within the casing 26 is a plate 27 provided with a central opening, and a circumferential series of small openings 28 for a purpose to be hereinafter set forth. Rising from the distributing chamber 20 is a rod 29 which supports a baffle plate 30. Depending from the plate 30 is a perforated annular wall 31 which terminates within the inner ring 21 of the burner. The mixing chamber 13 is provided with air inlet openings 32 adjacent the lower end thereof.

Rising from the horizontally disposed extension 15 of the fuel supply pipe is a pilot tube 34 which passes between the mixing chamber 13 and the perforated annulus 25 terminating in close proximity to the burner proper. It will be noted that the tube 34 communicates with the supply pipe in advance of the valve 17, so that the pilot will remain burning irrespective of the position of the valve. Arranged at a point immediately above the casing 26 is a ring 35.

In practice, the valve 17 is opened through the instrumentality of the rod 19, thus admitting fuel to the mixing chamber 13. The requisite amount of air enters the chamber through the openings 32, commingling with the fuel forming a perfect combustion. The fuel passes from the mixing chamber into the distributing chamber 20, from where it passes through the tubes 23 between the spaced members 21 and 22 of the burner. This provides for a perfect blue flame. A large quantity of air enters the casing 26 from under the ring 35, the air passing through the openings 28, and thence down between the casing 26 and the drum 10 to a point where it is admitted to the space between the mixing chamber 13 and the drum 10, through the perforated annulus 25. It is of course understood that the drum 10, casing 26 as well as the mixing chamber are heated from the burner, and as the air circulates around these parts it is consequently heated to a very high degree. The air upon entering the space between the mixing chamber 13 and the drum 10 passes upwardly in this space through the burner proper, striking against the baffle plate 30. This plate deflects the air, causing it to pass into the room through the perforations in the wall 31. In this manner, the air is heated to a maximum degree in quick order, and with the consumption of a minimum amount of fuel.

While I have shown and described what I consider the preferred embodiment of the invention, I desire to have it understood that I do not limit myself in this connection and that such changes may be resorted to when desired as fall within the scope of what is claimed.

What is claimed is:

1. A burner comprising an inner member, an outer member spaced from and surrounding said inner member, a mixing chamber disposed within the inner member, a fuel supply pipe leading into said chamber, a valve in said pipe, and a distributing chamber establishing communication between the mixing chamber and the space between said members.

2. A burner comprising an inner member, an outer member spaced from and surrounding said inner member, a mixing chamber disposed centrally within the inner member, a fuel supply pipe leading into said chamber, a valve in said pipe, and a distributing chamber associated with the mixing chamber, and establishing communication between the latter and the space between said members.

3. A burner comprising an inner member, an outer member spaced from and surrounding said inner member, a mixing chamber disposed within the inner member, a fuel supply pipe leading into said chamber, the wall of said chamber having a plurality of spaced openings adjacent its point of connection with the fuel supply pipe, a valve in said pipe, and a distributing chamber reposing upon the mixing chamber, and establishing communication between the latter and the space between said members.

4. A burner comprising an inner member, an outer member spaced from and surrounding said inner member, a mixing chamber arranged within the inner member a fuel supply pipe leading into said chamber, the wall of said chamber having a plurality of spaced openings, a valve in said pipe, a distributing chamber reposing upon the mixing chamber and communicating therewith, and radially disposed tubes projecting from the distributing chamber and establishing communication between the latter and the space between said members.

5. A burner comprising spaced inner and outer members, a mixing chamber, a fuel supply pipe leading into said chamber, the wall of said chamber having spaced openings, a valve in said pipe, a distributing chamber establishing communication between the mixing chamber and the space between said members, a baffle plate spaced above said members, and an annular wall depending from said plates and terminating in a plane below the upper edges of said members.

6. A burner including spaced inner and outer members, a mixing chamber partly arranged within the inner member, a fuel supply pipe leading into said mixing chamber, the wall of said chamber having spaced openings, a distributing chamber associated with the mixing chamber, and establishing communication between the latter and the space between said members, a perforated annulus surrounding the outer member, and a casing concentrically disposed in spaced relation to the perforated annulus and providing an air inlet at the upper end thereof.

7. A burner including spaced inner and outer members, a mixing chamber partly fitted within the inner member and having air inlet openings, a fuel supply pipe leading into said chamber, a distributing chamber establishing communication between the mixing chamber and the space between said members, a perforated annulus surrounding said outer member, a casing concentrically disposed in spaced relation to said annulus and providing an air inlet at the upper end thereof, a baffle disposed above the said spaced member, and a perforated annular wall depending from the baffle and terminating in a plane beneath the upper edge of said members.

In testimony whereof I affix my signature.

WILLIAM N. REGAN.